Patented Mar. 19, 1946

2,396,785

UNITED STATES PATENT OFFICE 2,396,785

PROCESS FOR POLYMERIZING OLEFINS WITH OTHER POLYMERIZABLE ORGANIC COMPOUNDS

William E. Hanford, Wilmington, Del., assignor to E. I. du Pont de Nemours & Company, Wilmington, Del., a corporation of Delaware No Drawing. Application March 15, 1941, Serial No. 383,554

5 Claims. (Cl. 260—78)

This invention relates to polymerization processes, and more particularly to the polymerization of olefinic compounds.

Solid polymers of ethylene having unique properties have been obtained by subjecting ethylene to high pressures, which are at least 500 atmospheres and preferably more than 1500 atmospheres, and at temperatures of 100° to 400° C. This method has been used also to obtain interpolymers from mixtures of ethylene and other polymerizable compounds. The process may be carried out in the presence of nitrogen or other inert gases and polymerization catalysts including oxygen and oxidizing agents are optionally used.

This invention has as an object a new and improved process for polymerizing ethylene alone and in admixture with propylene or other polymerizable organic compounds. Another object is to provide a process for the preparation of polymers of propylene with other polymerizable organic compounds. Still another object is to provide a process for the preparation of polymers of the kind mentioned above, which is capable of being operated at pressures and temperatures which are substantially lower than those previously used. An additional object is to provide a process which is adapted to the production of a large variety of polymers, some of which are not readily obtainable, or are not obtainable at all, by prior art methods. Other objects will appear hereinafter.

The above objects are accomplished by carrying out the polymerization process by the methods more fully described hereinafter in the presence of a normally liquid non-polymerizable organic liquid compound containing no active hydrogen, as determined by the Zerewitinoff method.

The present process as it is usually practiced consists in heating under pressure the ethylene, or mixtures comprising ethylene with other polymerizable organic compounds, while in contact with the above mentioned organic liquid and a peroxide compound as the polymerization catalyst, the heating being at a temperature above about 40° C., under a pressure which may be as low as 35 atmospheres. The most satisfactory temperature and pressure conditions depend upon the polymerizing characteristics of the particular system used. If ethylene is being polymerized alone or with other polymerizable substances, the polymerization is carried out preferably at from 50° C. to 100° C. since in this range the reaction velocity is fast enough to be practical and the molecular weight is high enough for the product to be useful. If, however, ethylene is being polymerized with another substance which alone polymerizes very vigorously, such as methacrylic anhydride, or which polymerizes quite rapidly with ethylene, as does maleic anhydride, it is preferable to operate in a lower temperature range such as from 40° to 80° C. In the light of the examples given herein it will be found that optimum or near optimum temperature in any instance can, if necessary, be ascertained after a few experiments. The upper pressure limit is restricted only by the strength of the equipment used. Pressures of 200 or more atmospheres, are generally used in the case of ethylene.

The organic liquids which contain no active hydrogen, as determined by the Zerewitinoff method (Ber. 40, 2026 (1907); J. Am. Chem. Soc. 49, 3181 (1927)), and in which the process is carried out include saturated aliphatic hydrocarbons and aromatic hydrocarbons. Specific compounds used include toluene and isooctane.

The following general procedure illustrates one manner of practicing this invention which may be operated either as a batch, semi-continuous, or continuous operation.

A pressure vessel is charged with catalyst, organic solvent, and, if interpolymers are to be prepared, a polymerizable organic compound other than the ethylene or propylene. The vessel is closed and pressured with ethylene or propylene as the case may be and the whole system is agitated, and heated to the desired temperature. Upon reaching reaction temperature or after a period of induction at that temperature, the reaction starts and may be followed by a pressure drop due to polymerization of the ethylene. Throughout the period of reaction, pressure is maintained in the desired range by periodic introduction of additional ethylene. When reaction is complete, the vessel is cooled, bled of excess gas, opened, and the contents discharged. The product is isolated by methods well known to those skilled in the art.

The following examples are further illustrative of methods for practicing my invention. Parts are by weight unless otherwise stated.

*Example 1*

A silver-lined steel reaction vessel was charged with 50 parts of toluene, 50 parts of maleic anhydride and 0.4 part of benzoyl peroxide. The bomb was closed, placed in an agitating rack, pressured with ethylene to 570 atmospheres, and heated to 98° C. at which temperature the pressure was 835 atmospheres. The reaction started immediately, evolving a large amount of heat which caused the temperature to rise to 186° C. In 40 minutes the total pressure drop was observed to be 330 atmospheres and over an additional 3.75 hours further pressure drop was negligible. The reaction vessel was cooled, bled of excess ethylene, opened, and the contents discharged. The crude reaction mixture amounting to 95 parts was treated with additional toluene and boiled to dissolve unreacted maleic anhydride. The polymer was filtered and, after an additional extraction of maleic anhydride, was pressed dry on the filter and dried in an oven at 120° C. There was thus obtained 60 parts of a white powder which was found to contain 57.7% carbon and 5.2% hydrogen. From these analyses it may be calculated that the ratio of ethylene to maleic anhydride in the polymer is 1.1:1.

The above experiment was repeated at 85° C. The temperature in this case reached 130° C. The yield was 55 parts of a polymer similar to that obtained above.

Another run in which the amount of toluene was increased to 100 parts was carried out at 85° to 87° C. and 860 to 975 atmospheres ethylene pressure. During a reaction time of 9.8 hours, the total pressure drop amounted to 335 atmospheres. There was obtained 54 parts of polymer containing 56.82% carbon and 4.98% hydrogen. From these analyses it may be calculated that the ethylene:maleic anhydride ratio is 1:1.

Example 2

An aluminum-lined steel reaction tube was charged with 100 parts toluene, 25 parts of maleic anhydride, and 0.4 part benzoyl peroxide. The tube was closed, placed in an agitating rack, and pressured with ethylene to 600 atmospheres. Heating and agitation were started and during a reaction time of 15.5 hours the temperature was maintained at 84° to 85° C. (except for the first hours when reaction caused the temperature to rise to 90° C.) and the pressure at 870–980 atmospheres. Throughout this time the total observed pressure drop was 250 atmospheres. The reaction vessel was cooled, bled of excess ethylene, and the contents discharged. The crude reaction mixture amounting to 107 parts was boiled with toluene, filtered, and dried by heating under vacuum at steam temperature for 16 hours. There was thus obtained 25.8 parts of a hard, white polymer softening above 200° C.

Example 3

An aluminum-lined reaction vessel was charged with 20 parts of N-vinyl phthalimide, 80 parts of isooctane, and 0.4 part of benzoyl peroxide, closed, placed in an agitating rack and pressured with 550 atmospheres of ethylene. Heating and agitation were started and during a reaction time of ten hours the temperature was maintained at 117° to 120° C. and the pressure at 895 to 915 atmospheres. The reaction vessel was allowed to cool and the contents discharged. The crude reaction mixture amounting to 135 parts was filtered. The insoluble portion was digested with alcohol, and filtered while hot. The alcohol-insoluble portion was a tough plastic amounting to 8 parts. This was freed of alcohol by drying in a vacuum at 70° C. This polymer was found to contain 4.9% nitrogen from which it may be calculated that the ratio of the ethylene to vinyl phthalimide is about 14:1.

Example 4

An aluminum-lined reaction vessel was charged with 40 parts of vinyl formate, 160 parts toluene, and 0.4 part of benzoyl peroxide. The reaction vessel was closed, placed in an agitating rack and pressured with ethylene to 550 atmospheres. Heating and agitation were started and over an eleven-hour reaction time the temperature was maintained at 83° to 85° C. and the pressure at 860 to 950 atmospheres. During the first four hours of reaction, the pressure drop amounted to 120 atmospheres. During the last 7 hours the pressure drop was negligible. After cooling, the contents of the tube were discharged and found to amount to 180 parts. This material was distilled directly and the following fractions obtained:

A. Boiling at 45° to 51° C.—18 parts—(vinyl formate)
B. Boiling at 108° to 112° C.—137 parts—(toluene)
C. A small gummy residue still containing toluene.

This residue was transferred to an evaporating dish with additional toluene and evaporated to dryness. The yellow viscous liquid thus obtained was finally freed of toluene by heating under high vacuum at 70° C. This yielded 5 grams of a yellow viscous liquid which had a saponification number of 335.6; 332.8, from which it may be calculated that vinyl formate constitutes 42.9% by weight of the polymer. The ethylene:vinyl formate ratio in this polymer is 3.4:1.

An experiment similar to the above was carried out using 40 parts of vinyl formate, 130 parts of dioxane and 0.4 part of benzoyl peroxide. During a reaction time of 11.3 hours the temperature was maintained at 79° to 81° C. and the pressure at 850 to 1000 atmospheres. The polymer was isolated as in the previous experiment and amounted to 36 parts by weight. This product had a saponification number of 200.3; and 198.2, from which it may be calculated that the ethylene:vinyl formate ratio is 7.5:1.

Example 5

An aluminum-lined reaction vessel was charged with 20 parts of divinyl formal, 80 parts of isooctane, and 0.4 part of benzoyl peroxide. The reaction vessel was closed, placed in an agitating rack, pressured with ethylene to 600 atmospheres, and heating and agitation were started. During the reaction time of 11.25 hours the temperature was maintained at 93° to 96° C., and the pressure at 635 to 960 atmospheres. During the first 4.25 hours, the total pressure drop amounted to 355 atmospheres. During the next seven hours the pressure drop was negligible. After cooling, the vessel was bled of ethylene, opened, and the reaction mixture, amounting to 84 parts, discharged. A small amount of isooctane was filtered from the polymer. The polymer was dissolved by heating in toluene and precipitated by drowning in ethanol. The precipitate was filtered, washed with methanol, and dried at 70° C. There was thus obtained 20 parts of a white fluffy thermoplastic polymer. The polymer when molded gave strong, flexible chips. Strong clear films were prepared by hot pressing of the polymer. Analysis of the polymer showed it to contain 78.7% carbon and 13.1% hydrogen from which it may be calculated that the mole ratio of ethylene to divinyl formal is 9.55:1.

The above experiment was repeated using 20 parts of divinyl formal to 80 parts of isooctane, and 0.4 part of benzoyl peroxide. The polymer formed was isolated by dissolving it in 500 parts (by volume) of isooctane to which had been added one-half part of hydroquinone. The solution was filtered into an equal volume of alcohol, cooled, and the polymer filtered. The filter cake was washed with methanol, sucked dry, and dried in an oven at 70° C. There was obtained 34 parts of polymer which by analysis was found to contain 80.6% carbon and 12.8% hydrogen, from which it may be calculated that the ethylene-divinyl formal ratio is 14.3:1. This polymer was soluble in toluene and xylene and was found to have an intrinsic viscosity of 0.73 at 85° C.

Example 6

An aluminum-lined steel reaction vessel was charged with 20 parts of divinyl butyral, 80 parts of isooctane, and 0.4 part of benzoyl peroxide. The tube was closed, placed in an agitating rack and pressured with ethylene to 600 atmospheres. During a reaction time of about ten hours, the temperature was maintained at 85° to 86° C. and the pressure at 855 to 965 atmospheres. During the first half of the reaction time the total pressure drop was observed to be 195 atmospheres. During the second half there was no further drop in pressure. When cooled, the reaction vessel was bled of ethylene, opened, and the contents discharged. This amounted to 82 parts. An additional 100 parts of isooctane was added and the mixture heated until solution was complete. The polymer was recovered by drowning in an equal volume of alcohol, and filtered. The filter cake was washed with methanol, sucked dry, and dried in an oven at 70° C. There was thus obtained 7.3 parts of polymer which melted fairly sharply at about 100° C.

Example 7

An aluminum-lined steel reaction vessel was charged with 20 parts of methacrylic anhydride, 80 parts isooctane, and 0.4 part benzoyl peroxide. The reaction vessel was closed, placed in an agitating rack, and pressured with ethylene to 580 atmospheres. Heating and agitation were started and during a reaction time of 11.25 hours the temperature was maintained at 94° to 95° C. and the pressure at 850 to 960 atmospheres (the initial reaction was very rapid, carrying the temperature to a maximum of 110° C. which was maintained for ¾ hour). During 2.25 hours there was a pressure drop of 305 atmospheres and during an additional 9 hours there was a negligible pressure drop. The reaction vessel was cooled, opened, and the contents discharged. From 95 parts of material there was obtained 29.5 parts of polymer softening at 108° C. This polymer was insoluble in boiling toluene, carbon tetrachloride, absolute alcohol, ethyl acetate, and water, but was soluble on warming with 1-N-sodium hydroxide. This latter solution deposited a white flocky polymer on being acidified. The polymer was found to contain 69.8% carbon and 9.9% hydrogen from which it may be calculated that the ethylene:methacrylic anhydride ratio is 2.6:1.

Example 8

A silver-lined steel reaction vessel was charged with 25 parts of maleic anhydride, 85 parts toluene and 0.1 part benzoyl peroxide. The reaction vessel was closed and 40 parts of propylene was added by expansion from a storage cylinder. The tube was then fitted with internal and external thermocouples and placed in a shaker rack. The outside temperature was gradually raised until the inside thermocouple showed 85° to 90° C. This temperature was maintained for a period of 10 hours after which the tube was allowed to cool. The tube was then opened and the contents discharged. The yield of crude polymer obtained was 70 parts. The crude polymer was washed with hot toluene to remove any unreacted maleic anhydride and after filtering, dried in an oven at 70° C. The dried material obtained was a white powder amounting to 40 parts. It could be pressed into a chip with a softening point of approximately 115° C. The carbon and hydrogen analysis showed 59.1% carbon and 5.9% hydrogen. From these figures the ratio of propylene to maleic anhydride is calculated to be 1:1.

Example 9

A silver-lined steel reaction vessel was charged with 20 parts of N-butyl maleimide, 80 parts of toluene and 0.3 part of benzoyl peroxide. The reaction vessel was closed and 60 parts of propylene added by expansion from a storage cylinder. The tube was then fitted with internal and external thermocouples and placed in a shaker rack. The outside temperature was gradually raised until the inside thermocouple showed 80° to 90° C. It was kept at this temperature for 12 hours, allowed to cool, and the contents of the tube discharged. A viscous solution A and a sticky mass B were obtained as products. Product A was filtered through a coarse filter cloth. Films cast from the filtrate were transparent, resinous and enamel-like in character. Analysis of the dried material showed it to contain 66.3% carbon, 8.1% hydrogen, and 6.9% nitrogen. From these figures it may be calculated that the N-n-butylmaleimide:propylene ratio is 1:1. Product B was dried and found to have a softening point of 80–83° C. Analysis of the dried product showed it to contain 67.2% carbon, 8.2% hydrogen, and 7.1% nitrogen. These analyses show a N-n-butyl-maleimide:propylene ratio of 1:1.

Example 10

A silver-lined steel reaction vessel was charged with 20 parts diethyl fumarate, 80 parts toluene, and 0.3 part benzoyl peroxide. The reaction vessel was closed, 60 parts of propylene added by expansion from a storage cylinder, fitted with internal and external thermocouples, and placed in a shaker rack. The outside temperature was gradually raised until the inside thermocouple showed 85° to 90° C. and maintained at this temperature for 12 hours. After cooling, the contents were filtered through a filter cloth and a viscous, clear, water-white liquid obtained. On drying in an oven at 75° to 80° C., this liquid lost 21.9% by weight and a hard brittle clear mass was obtained. Analysis showed it to contain 78.8% carbon and 10.8% hydrogen. The propylene:diethyl fumarate ratio is calculated to be 11.5:1.

Example 11

A silver-lined steel reaction vessel was charged with 30 parts N-vinylphthalimide, 80 parts toluene, 0.5 part benzoyl peroxide. The reaction vessel was closed, 40 parts propylene added by expansion from a pressure storage, fitted with internal and external thermocouples, and placed in a shaker rack. The outside temperature was gradually raised until the inside thermocouple showed 80° to 90° C. It was kept at this temperature for 12 hours, allowed to cool, and the contents then discharged. The reaction product obtained was filtered and dried under vacuum.

25.5 parts of a transparent, greenish, brittle mass was obtained. Analysis showed the product to contain 6.8% nitrogen, and its intrinsic viscosity to be 0.06 at 85° C. in toluene. On basis of nitrogen content the propylene:N-vinylphthalimide ratio is calculated to be 1:1.

Example 12

A silver-lined steel reaction vessel was charged with 50 parts toluene and 1.0 part benzoyl peroxide. The tube was closed and 60 parts propylene and 40 parts vinyl chloride added by expansion from pressure storage cylinders. The reaction vessel was then fitted with internal and external thermocouples, and placed in a shaker rack. The outside temperature was gradually raised until the inside thermocouples showed 85° to 90° C. It was kept at this temperature for 12 hours, allowed to cool, and the contents then discharged. The reaction product obtained was a transparent and very viscous mass which dried to a sticky film and slowly became hard.

Example 13

An aluminum-lined steel reaction vessel was charged with 100 parts of acrylonitrile and 0.2 part of benzoyl peroxide. The tube was closed, placed in an agitating rack and pressured with ethylene to about 600 atmospheres. Heating and agitation were started and during the reaction time of 11 hours the temperature was maintained at 85° C. and the pressure at 860 to 950 atmospheres. Throughout this time the total pressure drop was observed to be 200 atmospheres. The reaction mixture was placed in a steam still and freed of unreacted acrylonitrile by steam distillation. The residue was then rinsed with methanol and dried at 70° C. There was thus obtained 19.7 parts of a hard yellow resin which by analysis was found to contain 23.5% nitrogen. On the basis of nitrogen content the ethylene: acrylonitrile ratio is calculated to be 1:4.

Example 14

An aluminum-lined steel reaction vessel was charged with 60 parts of acrylonitrile, 40 parts of isooctane, and 0.2 part of benzoyl peroxide. The reaction vessel was closed, placed in an agitating rack, and pressured with ethylene to about 600 atmospheres. During a reaction time of 11 hours the temperature was maintained at 85° C., and the pressure of 860 to 920 atmospheres. Throughout this time the total pressure drop was observed to be 65 atmospheres. The reaction vessel was cooled, bled of excess ethylene, and the contents discharged. The product was freed of isooctane and unreacted acrylonitrile by steam distillation, the solid product rinsed with methanol, and dried at 70° C. There was thus obtained 13 parts of a hard yellow resin which was found to contain 23.3% nitrogen. From this it may be calculated that the ethylene:acrylonitrile ratio in the polymer is 1:4.

Example 15

An aluminum-lined steel reaction vessel was charged with 100 parts of isooctane and 0.2 part of benzoyl peroxide. The tube was closed and 20 parts of propylene introduced by expansion from a storage cylinder. The reaction vessel was then placed in an agitating rack and pressured with ethylene to about 600 atmospheres. Heating and agitation were started and during a reaction time of 10 hours the temperature was maintained at 85° C. and the pressure at 820 to 930 atmospheres. Throughout this time the total pressure drop was observed to be 140 atmospheres. The bomb was cooled, bled of excess gas, and the contents discharged. Isooctane was steam distilled from the reaction mixture and the solid residue filtered, rinsed with methanol, and dried at 70° C. There was obtained 5.8 parts of a hard wax which melted (block Macquenne) at 65° to 70° C. and which had an intrinsic viscosity (0.25% in xylene at 86° C.) of 0.72.

Example 16

A stainless steel reaction vessel is charged with 40 parts of vinyl acetate, 60 parts of isooctane, and 0.2 part of benzoyl peroxide. The reaction vessel is closed, evacuated, placed in a shaker machine and heating and agitation started. During a reaction time of 10 hours, during which the temperature is maintained at 75° to 77° C. and the pressure at 860 to 950 atmospheres by periodic addition of ethylene, there is an observed total pressure drop of 345 atmospheres. The reaction vessel is allowed to cool, bled of excess ethylene, and the contents discharged. The reaction mixture is steam distilled to separate isooctane and unreacted vinyl acetate, the interpolymer separated from residual water, washed, and dried by milling on a rubber mill. There is thus obtained 25 parts of a vinyl acetate/ethylene interpolymer having an intrinsic viscosity of 0.83 (measured as a 0.125% solution in xylene) and which contains 12.7% hydrogen and 77.6% carbon. From this analysis it may be calculated that the interpolymer has a vinyl acetate/ethylene mole ratio of 1 to 8.2.

Example 17

A silver-lined steel reaction vessel was charged with 150 parts of isooctane and 0.75 part of benzoyl peroxide. The vessel was closed, placed in an agitating rack and pressured with ethylene so that at a reaction temperature of 98° C. the pressure was 835 atmospheres. During a reaction time of 4.7 hours the temperature was maintained at 96° to 100° C. and the pressure at 850 to 955 atmospheres. Throughout this time the observed pressure drop amounted to 335 atmospheres. The reaction vessel was cooled, bled of excess ethylene, and the contents discharged. The polymer was freed of isooctane by steam distillation, then dried in an oven at 70° C. There was thus obtained 22 parts of polymer which melted at 113° to 114° C.

In the practice of this invention any peroxide compound may be used as a polymerization catalyst. The expression "peroxide compound" is used herein to refer to compounds which are either formed by the action of hydrogen peroxide on ordinary acids or else which give rise to hydrogen peroxide when treated with dilute sulfuric acid. Catalytic materials of this kind include benzoyl peroxide, lauroyl peroxide, acetylbenzoyl peroxide, peracetic acid, alkali metal persulfates, e. g., sodium and potassium persulfates, alkali metal and ammonium perborates and percarbonates, etc. Other compounds which are operative as catalysts include para-toluene sulfinic acid.

In practice it is desirable to use equipment fabricated of, or lined with, materials which will not catalyze too rapidly the decomposition of peroxides to molecular oxygen. Examples of such lining materials are silver, aluminum, tin, glass, stainless steel, etc.

The presence of molecular oxygen in ethylene and propylene generally affects the rate and extent of reaction and it is therefore preferred to use ethylene and propylene which are as oxygen-free as practicable.

In commercial practice a continuous process offers advantages of efficiency, more accurate control, and especially in the case of interpolymers better possibilities for adjusting the ratio of interpolymerizing ingredients. For efficient operation in a continuous process a rapid rate of reaction is necessary. The essential conditions used in continuous operation, technique of agitation, isolation of finished products, and recirculation of unreacted materials may be varied widely. For example, ethylene or propylene under pressure may be mixed continuously with the non-polymerizing organic solvent containing a peroxide compound and the solution, maintained in a turbulent state, passed under pressure through a reactor in which the time of contact and temperature are controlled, to effect the required degree of polymerization. The resulting reaction mixture may then pass into an area of lower pressure to recover unreacted ethylene or propylene and the polymer isolated by any of the methods well known to the art. When polymerizing ethylene or propylene with a liquid unsaturated compound, the latter can be introduced continuously in solution in the organic solvent. When it is desired to polymerize two or more substances continuously, the reactants may be premixed in the desired proportions and injected into the organic solvent containing the peroxide compound, and the pressure and temperature adjusted to the desired conditions. Alternatively the polymerizable organic compound to be polymerized with the ethylene or propylene may be separately injected into the reactor containing the organic solvent and catalyst.

By the process of this invention copolymers can also be made, by which term is meant the products obtainable by the polymerization of ethylene with one or more polymeric materials resulting from the polymerization of organic compounds.

By means of this invention a large number of interpolymers of ethylene or propylene with other polymerizable organic compounds may be made. The term "polymer" as used herein and in the claims is intended to include the products obtained by polymerizing ethylene alone or ethylene with propylene or ethylene or propylene with other polymerizable organic compounds having ethylenic unsaturation. The compounds coming within the scope of this invention are those comprehended within the scope of the formula:

in which two or more of A, B, D, or E are hydrogen and in which the substituent or substituents other than hydrogen are alkyl, aryl, acyl, acyloxy, cyano, halogen, diacylimido, alkoxy, aryloxy, carbalkoxy, carbamyl, carboxy, the group R'ORO (R' being vinyl and R being a divalent hydrocarbon radical), or the group —COXCO— (two substituents together or one substituent with the second valence of the group —COXCO— satisfied by the same or a different monovalent radical (X=O, NR, S, a divalent hydrocarbon radical, or the group —ORO— where R is a divalent hydrocarbon radical)).

The following specific classes of compounds come within the scope of the above formula:

I. Where A, B, D, and E are hydrogen the compound is ethylene.

II. Where A, B, and D are hydrogen and E has the significance indicated below:

| E= | Examples |
|---|---|
| Alkyl | $CH_3CH=CH_2$ and higher alkene-1's |
| Aryl | $C_6H_5CH=CH_2$ |
| Acyl | $CH_3COCH=CH_2$ |
| Acyloxy | $CH_3COOCH=CH_2$ |
| Cyano | $NCCH=CH_2$ |
| Halogeno | $ClCH=CH_2$ |
| Diacylimido | ![phthalimide vinyl structure: benzene ring fused to five-membered ring with two CO groups and N—CH=CH₂] |
| Alkoxy | $CH_3OCH=CH_2$ |
| Aryloxy | $C_6H_5OCH=CH_2$ |
| Carbalkoxy | $CH_3OCOCH=CH_2$ |
| Carbamyl | $H_2N-CO-CH=CH_2$ |
| R'ORO— | $CH_2=CHOCH_2OCH=CH_2$ <br> $CH_2=CHOCH(C_3H_7)OCH=CH_2$ |
| —COXCO— with 1 valence linked to above formula | $CH_2=CHCO{-}O{-}CO{-}CH=CH_2$ (anhydride); $CH_2=CHC(=O){-}O{-}C(=O){-}CH_3$ ; $CH_3C(=O){-}O{-}C(=O)$ ; and cyclic variants with O, CH₂ bridges |
| Carboxy | $CH_2=CHCOOH$ |

III. Where either A and E or A and B are hydrogen and D has the indicated significance:

| D= | Two hydrogens on one carbon (A,B=H, E=alkyl) | One hydrogen on each carbon [1] (A,E=H, B=alkyl) |
|---|---|---|
| Alkyl | $CH_2=C(CH_3)_2$ | $CH_3-CH=CH-CH_3$ |

See footnote at end of table.

| D= | Two hydrogens on one carbon (A,B=H, E=alkyl) | One hydrogen on each carbon [1] (A,E=H, B=alkyl) |
|---|---|---|
| Aryl | $C_6H_5CCH_2=CH_2$ | $C_6H_5CH=CHCH_3$ |
| Acyl | $CH_2=C(CH_3)-COCH_3$ | $CH_3CH=CHCOCH_3$ |
| Acyloxy | $CH_2=C(CH_3)-OCCH_3$ (O) | $CH_3CH=CHOCCH_3$ (O) |
| Cyano | $CH_2=C(CN)-CH_3$ | $CH_3-CH=CHCN$ |
| Halogeno | $CH_2=C(Cl)-CH_3$ | $ClCH=CHCH_3$ |
| Diacylimido | $CH_2=C(CH_3)-N$(phthalimido-hexahydro) | $CH_3CH=CHN$(phthalimido-hexahydro) |
| Alkoxy | $CH_2=C(OCH_3)-CH_3$ | $CH_3OCH=CHCH_3$ |
| Aryloxy | $CH_2=C(OC_6H_5)-CH_3$ | $C_6H_5OCH=CHCH_3$ |
| Carbalkoxy | $CH_2=C(CH_3)-COOCH$ | $CH_3-CH=CHCOOCH_3$ |
| Carbamyl | $CH_2=C(CH_3)-CONH_2$ | $CH_3-CH=CHCONH_2$ |
| R'ORO— | $CH_2=C(CH_3)-OCH_2O-CH=CH_2$ | $CH_3-CH=CHOCH_2OCH=CH_3$ |
| —COXCO— | $CH_2=C(CH_3)-C(=O)-O-C(=O)-C(CH_3)=CH_2$ ; $CH_2=C(CH_3)-C(=O)-O-CH_2-O-C(=O)-C(CH_3)=CH_2$ | $CH_3CH=CHC(=O)-O-C(=O)CH=CHCH_3$ |
| Carboxy | $CH_2=CCOOH(CH_3)$ | $CH_3-CH=CHCOOH$ |

[1] Corresponding cis compounds can also be used.

| D= | Two hydrogens on one carbon (A,B=H, E=aryl) | One hydrogen on each carbon (A,E=H, B=aryl) |
|---|---|---|
| Aryl | $(C_6H_5)_2C=CH_2$ | $C_6H_5CH=CHC_6H_5$ |
| Acyl | $C_6H_5C=CH_2$ ; $O=CCH_3$ | $C_6H_5CH=CHCOCH_3$ |
| Acyloxy | $C_6H_5C=CH_2$ ; $O-C(=O)-CH_3$ | $C_6H_5CH=CHOCCH_3$ (O) |
| Cyano | $C_6H_5C(CN)=CH_2$ | $C_6H_5CH=CH-CN$ |
| Halogeno | $C_6H_5C(Cl)=CH_2$ | $C_6H_5CH=CHCl$ |
| Diacylimido | $C_6H_5C=CH_2$ (N-phthalimido-hexahydro) | $C_6H_5CH=CH-N$(phthalimido-hexahydro) |

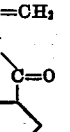

| D= | Two hydrogens on one carbon (A,B=H, E=acyloxy) | | One hydrogen on each carbon (A,E=H, B=acyloxy) |
|---|---|---|---|
| Acyloxy | CH₃COOC=CH₂<br>       OC—CH₃<br>       ‖<br>       O | | CH₃COOCH=CHOCCH₃<br>                    ‖<br>                    O |
| Cyano | CH₃COOC=CH₂<br>       CN | | CH₃COOCH=CHCN |
| Halogeno | CH₃COOC=CH₂<br>       Cl | | CH₃COOCH=CHCl |
| Diacylimido | CH₃COOC=CH₂<br>       N<br>    O=C  C=O<br>     (cyclohexane ring) | | CH₃COOCH=CHN(CO)₂(cyclohexane) |
| Alkoxy | CH₃—COOC=CH₂<br>        OCH₃ | | CH₃COOCH=CHOCH₃ |
| Aryloxy | CH₃COO—C=CH₂<br>        OC₆H₅ | | CH₃COOCH=CHOC₆H₅ |
| Carbalkoxy | CH₃COOC=CH₂<br>       COOCH₃ | | CH₃COOCH=CHCOOCH₃ |
| Carbamyl | CH₃COOC=CH₂<br>       CONH₂ | | CH₃COOCH=CHCONH₂ |
| Carboxy | CH₃COOC=CH₂<br>       COOH | | CH₃COOCH=CHCOOH |
| R'O—R—O— | CH₃COOC=CH₂<br>       OCH₂OCH=CH₂ | | CH₃COOCH=CH—O—CH₂O—CH=CH₂ |
| —COXCO— | CH₃COOC=CH₂<br>       C=O<br>       O<br>       C=O<br>CH₃COOC=CH₂, | CH₃COOC=CH₂<br>       C=O<br>       O<br>       C=O<br>       CH₃ | CH₃COO—CH=CH—C=O<br>                  O<br>CH₃COO—CH=CH—C=O,<br>CH₃COOCH=CH—C=O<br>                O<br>                CH₃C=O |

| D= | Two hydrogens on one carbon (A,B=H, E=cyano) | One hydrogen on each carbon (A,E=H, B=cyano) |
|---|---|---|
| Cyano | CH₂=CCN<br>     CN | CH=CHCN<br> CN |
| Halogeno | CH₂=C—CN<br>     Cl | CH=CHCl<br> CN |
| Diacylimido | CH₂=C—CN<br>     N<br>  O=C  C=O<br> (cyclohexane ring) | CH=CHN(CO)₂(cyclohexane)<br> CN |
| Alkoxy | CH₂=C—CN<br>     OCH₃ | CH=CH—OCH₃<br> CN |
| Aryloxy | CH₂=C—CN<br>     OC₆H₅ | CH=CHOC₆H₅<br> CN |
| Carbalkoxy | CH₂=C—CN<br>     COOC₂H₅ | CH=CHCOOC₂H₅<br> CN |
| Carbamyl | CH₂=C—CN<br>     CONH₂ | CH=CHCONH₂<br> CN |
| Carboxy | CH₂=C—CN<br>     COOH | CH=CHCOOH<br> CN |
| R'—O—R—O— | CH₂=C—CN<br>     OCH₂OCH=CH₂ | CH=CHOCH₂OCH=CH₂<br> CN |

| D= | Two hydrogens on one carbon (A,B=H, E=acyloxy) | One hydrogen on each carbon (A,E=H, B=acyloxy) |
|---|---|---|
| —COXCO— | $CH_2=C-CN$ $\quad$ $CH_2=C-CN$ <br> $\quad\quad\;\;\|$ $\quad\quad\quad\quad\quad\;\;\|$ <br> $\quad\quad C=O$ $\quad\quad\quad\quad C=O$ <br> $\quad\quad\;\;\|$ $\quad\quad\quad\quad\quad\;\;\|$ <br> $\quad\quad O$ $\quad\quad\quad\quad\quad O$ <br> $\quad\quad\;\;\|$ $\quad\quad\quad\quad\quad\;\;\|$ <br> $\quad\quad C=O$ $\quad\;\;\;$ $CH_3C=O$ <br> $\quad\quad\;\;\|$ <br> $CH_2=C-CN$ | $CH=CH-C-O-C-CH=CH$ <br> $\;\;\|\quad\quad\quad\;\;\|\quad\quad\;\;\|\quad\quad\quad\;\;\|$ <br> $CN\quad\quad\;\;O\quad\;\;O\quad\quad CN$ <br><br> $CH=CHC-O-C-CH_3$ <br> $\;\;\|\quad\quad\quad\;\;\|\quad\quad\;\;\|$ <br> $CN\quad\quad\;\;O\quad\;\;O$ |

| D= | Two hydrogens on one carbon (A,B=H, E=halogen) | One hydrogen on each carbon (A,E=H, B=halogen) |
|---|---|---|
| Halogeno | $CH_2=CCl$ <br> $\quad\quad\;\;\|$ <br> $\quad\quad Cl$ | $ClCH=CHCl$ |
| Diacylimido | $CH_2=CCl$ bonded to phthalimido (N between two C=O groups on benzene ring) | $ClCH=CHN$ bonded to phthalimido group |
| Alkoxy | $CH_2=CCl$ <br> $\quad\quad\;\;\|$ <br> $\quad\;\;OCH_3$ | $ClCH=CHOCH_3$ |
| Aryloxy | $CH_2=CCl$ <br> $\quad\quad\;\;\|$ <br> $\quad\;\;OC_6H_5$ | $ClCH=CHOC_6H_5$ |
| Carbalkoxy | $CH_2=C-Cl$ <br> $\quad\quad\;\;\|$ <br> $\quad\;\;COOCH_3$ | $ClCH=CHCOOCH_3$ |
| Carbamyl | $CH_2=C-Cl$ <br> $\quad\quad\;\;\|$ <br> $\quad\;\;CONH_2$ | $ClCH=CHCONH_2$ |
| Carboxy | $CH_2=CCl$ <br> $\quad\quad\;\;\|$ <br> $\quad\;\;COOH$ | $ClCH=CHCOOH$ |
| R'—O—R—O— | $CH_2=CCl$ <br> $\quad\quad\;\;\|$ <br> $\quad\;\;OCH_2OCH=CH_2$ | $ClCH=CHOCH_2O-CH=CH_2$ |
| —COXCO— | $CH_2=CCl$ $\quad\quad$ $CH_2=CCl$ <br> $\quad\;\;\|$ $\quad\quad\quad\quad\quad\;\;\|$ <br> $\quad\;\;C=O$ $\quad\quad\quad\;\;C=O$ <br> $\quad\;\;\|$ $\quad\quad\quad\quad\quad\;\;\|$ <br> $\quad\;\;O$ $\quad\quad\quad\quad\quad O$ <br> $\quad\;\;\|$ $\quad\quad\quad\quad\quad\;\;\|$ <br> $\quad\;\;C=O$ $\quad\quad\quad\;\;C=O$ <br> $\quad\;\;\|$ $\quad\quad\quad\quad\quad\;\;\|$ <br> $CH_2=CCl,$ $\quad\;\;CH_3$ | $ClCH=CHC=O$ $\quad$ $ClCH=CH-C=O$ <br> $\quad\quad\quad\quad\;\;\|$ $\quad\quad\quad\quad\quad\quad\quad\quad\;\;O$ <br> $\quad\quad\quad\quad\;\;O$ $\quad\quad\quad\quad\quad\quad\;\;CH_3C=O$ <br> $\quad\quad\quad\quad\;\;\|$ <br> $ClCH=CHC=O$ |

| D= | Two hydrogens on one carbon (A,B=H, E=alkoxy) | One hydrogen on each carbon (A,B=H, E=alkoxy) |
|---|---|---|
| Alkoxy | $CH_2=COCH_3$ <br> $\quad\quad\;\;\|$ <br> $\quad\;\;OCH_3$ | $CH_3OCH=CHOCH_3$ |
| Aryloxy | $CH_2=C-OCH_3$ <br> $\quad\quad\;\;\|$ <br> $\quad\;\;OC_6H_5$ | $CH_3OCH=CHOC_6H_5$ |
| Carbalkoxy | $CH_2=C-OCH_3$ <br> $\quad\quad\;\;\|$ <br> $\quad\;\;COOCH_3$ | $CH_3OCH=CHCOOCH_3$ |
| Carbamyl | $CH_2=C-OCH_3$ <br> $\quad\quad\;\;\|$ <br> $\quad\;\;CONH_2$ | $CH_3OCH=CHCONH_2$ |
| Carboxy | $CH_2=C-OCH_3$ <br> $\quad\quad\;\;\|$ <br> $\quad\;\;COOH$ | $CH_3OCH=CHCOOH$ |
| R'—O—R—O— | $CH_2=C-OCH_3$ <br> $\quad\quad\;\;\|$ <br> $\quad\;\;OCH_2OCH=CH_2$ | $CH_3OCH=CHOCH_2OCH=CH_2$ |
| —COXCO— | $CH_2=C-OCH_3$ $\quad$ $CH_2=COCH_3$ <br> $\quad\quad\;\;\|$ $\quad\quad\quad\quad\quad\;\;\|$ <br> $\quad\;\;C=O$ $\quad\quad\quad\;\;C=O$ <br> $\quad\quad\;\;\|$ $\quad\quad\quad\quad\quad\;\;\|$ <br> $\quad\;\;O$ $\quad\quad\quad\quad\quad O$ <br> $\quad\quad\;\;\|$ $\quad\quad\quad\quad\quad\;\;\|$ <br> $\quad\;\;C=O$ $\quad\quad\quad\;\;C=O$ <br> $\quad\quad\;\;\|$ $\quad\quad\quad\quad\quad\;\;\|$ <br> $CH_2=C-OCH_3$ $\;\;$ $CH_3$ | $CH_3OCH=CHC=O$ <br> $\quad\quad\quad\quad\quad\;\;\|$ <br> $\quad\quad\quad\quad\quad O$ <br> $\quad\quad\quad\quad\quad\;\;\|$ <br> $CH_3O-CH=CHC=O$ <br><br> $CH_3OCH=CH-CH_2-C=O,$ <br> $\quad\quad\quad\quad\quad\quad\quad\quad\quad\quad\;\;O$ <br> $\quad\quad\quad\quad\quad\quad\quad\quad\quad\quad\;\;\|$ <br> $\quad\quad\quad\quad\quad\quad\quad H_3C-C=O$ |

| D= | Two hydrogens on one carbon (A,E=H, B=aryloxy) | One hydrogen on each carbon (A,E=H, B=aryloxy) |
|---|---|---|
| Aryloxy | $C_6H_5OC=CH_2$<br>$\quad\mid$<br>$\quad OC_6H_5$ | $C_6H_5OCH=CHOC_6H_5$ |
| Carbalkoxy | $C_6H_5OC=CH_2$<br>$\quad\mid$<br>$\quad COOCH_3$ | $C_6H_5OCH=CHCOOCH_3$ |
| Carbamyl | $C_6H_5OC=CH_2$<br>$\quad\mid$<br>$\quad CONH_2$ | $C_6H_5OCH=CHCONH_2$ |
| Carboxy | $C_6H_5OC=CH_2$<br>$\quad\mid$<br>$\quad COOH$ | $C_6H_5OCH=CHCOOH$ |
| R'—O—R—O— | $C_6H_5OC=CH_2$<br>$\quad\mid$<br>$\quad OCH_2OCH=CH_2$ | $C_6H_5OCH=CHOCH_2O-CH=CH_2$ |
| —COXCO— | $C_6H_5OC=CH_2$<br>$\quad\mid$<br>$\quad C=O$<br>$\quad\mid$<br>$\quad O$<br>$\quad\mid$<br>$\quad C=O$<br>$\quad\mid$<br>$C_6H_5OC=CH_2$ | $C_6H_5OCH=CH-C=O$<br>$\qquad\qquad\quad\searrow$<br>$\qquad\qquad\qquad O$<br>$C_6H_5OCH=CH-C=O\;\nearrow$,<br>$C_6H_5OCH=CH-C=O$<br>$\qquad\qquad\quad\mid$<br>$\qquad\qquad\quad O$<br>$\qquad\qquad\quad\mid$<br>$\qquad\qquad CH_3C=O$ |

| D= | Two hydrogens on one carbon (A,B=H, E=carbalkoxy) | One hydrogen on each carbon (A,E=H, B=carbalkoxy) |
|---|---|---|
| Carbalkoxy | $CH_2=C-COOCH_3$<br>$\quad\mid$<br>$\quad COOCH_3$ | $CH=CHCOOCH_3$<br>$\mid$<br>$COOCH_3$ (fumaric and maleic esters). |
| Carbamyl | $CH_2=CCOOCH_3$<br>$\quad\mid$<br>$\quad CONH_2$ | $CH=CHCONH_2$<br>$\mid$<br>$COOCH_3$ |

| D= | Two hydrogens on one carbon (A,B=H E=carbamyl) | One hydrogen on each carbon (A,E=H, B=carbamyl) |
|---|---|---|
| Carbamyl | $CH_2=C-CONH_2$<br>$\quad\mid$<br>$\quad CONH_2$ | $CH=CHCONH_2$<br>$\mid$<br>$CONH_2$ |
| Carboxy | $CH_2=C-CONH_2$<br>$\quad\mid$<br>$\quad COOH$ | $CH=CHCOOH$<br>$\mid$<br>$CONH_2$ |
| Do | $CH_2=C-COOH$<br>$\quad\mid$<br>$\quad COOH$ | $CH=CHCOOH$<br>$\mid$<br>$COOH$ |

| D= | One hydrogen on each carbon (A,E=H) |
|---|---|
| B,D linked to —COXCO— where X=O | $HC-C\overset{O}{\|}$<br>$\quad\mid\quad\;O$<br>$\quad\mid$<br>$HC-C\overset{O}{\|}$<br>$\qquad\quad O$ |
| X=>NR | $HC-C\overset{O}{\|}$<br>$\quad\mid\;\;NC_6H_5$<br>$HC-C\overset{O}{\|}$ |
| X=S | $HC-C\overset{O}{\|}$<br>$\quad\mid\;\;S$<br>$HC-C\overset{O}{\|}$ |

The present invention is particularly valuable in connection with the preparation of interpolymers of ethylene and of propylene with polymerizable organic compounds which are easily hydrolyzable such as the interpolymers of ethylene and of propylene with methacrylic anhydride, maleic anhydride, methylene dimethacrylate, divinyl acetals, etc. In the preparation of such interpolymers it is generally preferred to operate in the range of 50° to 130° C. and at pressures ranging from 800 to 1000 atmospheres since polymers of optimum molecular weight are obtained thereby.

The process of this invention provides an improved method for polymerizing olefins having two and three carbon atoms which is economical in operation and which is adaptable to the production of a large variety of useful interpolymers particularly those with easily hydrolyzable organic compounds.

As many apparently widely different embodiments of this invention may be made without departing from the spirit and scope thereof, it is to be understood that I do not limit myself with specific embodiments thereof except as defined in the appended claims.

I claim:

1. A process for polymerizing a composition comprising ethylene and vinyl acetate which comprises heating a mixture thereof at a temperature between 40 and 130° C., in the presence of a solvent selected from the group consisting of saturated aliphatic hydrocarbons and aromatic hydrocarbons in the presence of a per compound catalyst, the reaction being carried out at a pressure above 35 atmospheres.

2. A process for polymerizing a composition comprising ethylene and maleic anhydride which comprises heating maleic anhydride under an ethylene pressure at a temperature between 40 and 186° C. in the presence of a solvent selected from the group consisting of saturated hydrocarbons and aromatic hydrocarbons in the presence of a per compound catalyst the reaction being carried out at a pressure above 35 atmospheres.

3. A process for polymerizing a composition comprising ethylene and divinyl acetal which comprises heating divinyl acetal under ethylene pressure at a temperature between 40 and 130° C. in the presence of a solvent selected from the group consisting of saturated hydrocarbons and aromatic hydrocarbons in the presence of a per compound catalyst the reaction being carried out at a pressure above 35 atmospheres.

4. A process for polymerizing a hydrolyzable composition from ethylene and an organic compound selected from the group consisting of organic polymerizable compounds containing mono-olefinic unsaturation and organic polymerizable compounds containing polyolefinic unsaturation in which the double bonds, of the compound containing polyolefinic unsaturation, are isolated, which comprises heating said composition at a temperature between 40 and 186° C. in the presence of a solvent selected from the group consisting of saturated aliphatic hydrocarbons and aromatic hydrocarbons, the polymerization being conducted in the presence of a per compound catalyst and at a pressure above 35 atmospheres.

5. A process for polymerizing a hydrolyzable composition from ethylene and an organic compound selected from the group consisting of organic polymerizable compounds containing mono-olefinic unsaturation and organic polymerizable compounds containing polyolefinic unsaturation in which the double bonds, of the compound containing polyolefinic unsaturation, are isolated, which comprises heating said composition at a temperature from 40 to 186° C. in the presence of a solvent selected from the group consisting of saturated aliphatic hydrocarbons and aromatic hydrocarbons, the polymerization being conducted in the presence of a per compound catalyst and at a pressure above 200 atmospheres.

WILLIAM E. HANFORD.